(12) United States Patent
Bartley et al.

(10) Patent No.: US 9,536,176 B2
(45) Date of Patent: Jan. 3, 2017

(54) ENVIRONMENTAL-BASED LOCATION MONITORING

(71) Applicant: International Business Machines Corporation, Armonk, NY (US)

(72) Inventors: Gerald K. Bartley, Rochester, MN (US); Darryl J. Becker, Rochester, MN (US); Matthew S. Doyle, Rochester, MN (US); Mark O. Maxson, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 9 days.

(21) Appl. No.: 14/664,975

(22) Filed: Mar. 23, 2015

(65) Prior Publication Data

US 2016/0283823 A1    Sep. 29, 2016

(51) Int. Cl.
| | | |
|---|---|---|
| *G06K 9/00* | (2006.01) | |
| *G06K 9/62* | (2006.01) | |
| *G06T 7/00* | (2006.01) | |
| *G06F 21/55* | (2013.01) | |

(52) U.S. Cl.
CPC ............. *G06K 9/6215* (2013.01); *G06F 21/55* (2013.01); *G06K 9/00771* (2013.01); *G06K 9/6202* (2013.01); *G06T 7/0044* (2013.01)

(58) Field of Classification Search
USPC ............................................ 382/103; 726/27
See application file for complete search history.

(56) References Cited

U.S. PATENT DOCUMENTS

| | | |
|---|---|---|
| 7,243,153 B2 | 7/2007 | McIntyre et al. |
| 7,545,903 B2 | 6/2009 | Köhler et al. |
| 7,877,809 B1 | 1/2011 | Sutton et al. |
| (Continued) | | |

FOREIGN PATENT DOCUMENTS

WO    2004057834 A2    7/2004

OTHER PUBLICATIONS

William of Occum, Occum's razor definition, 1835, The Free Dictionary, Retrieved from Internet on May 25, 2016, retrieved from URL:<http://www.thefreedictionary.com/Occums+razor>.*

(Continued)

*Primary Examiner* — Gregory F Cunningham
(74) *Attorney, Agent, or Firm* — Robert J. Shatto; Robert Williams

(57) ABSTRACT

Aspects of the present disclosure are directed towards environmental based location monitoring. Environmental based location monitoring can include collecting, a first set of image data that corresponds to a first set of environmental characteristics existing within a bounded area encompassing a hardware element of the computer and determining an environmental difference based on a difference between a first location corresponding to a geographic position of the hardware element relative to the first set of environmental characteristics and a second location corresponding to an approved geographic position of the hardware element. Environmental based location monitoring can include determining that the environmental difference does not satisfy a threshold and executing a reaction sequence in the computer, in response to determining that the environmental difference does not satisfy the threshold.

15 Claims, 6 Drawing Sheets

(56) References Cited

U.S. PATENT DOCUMENTS

| | | |
|---|---|---|
| 8,086,519 B2 | 12/2011 | Mylet et al. |
| 8,255,947 B2 | 8/2012 | Perry, II |
| 8,533,853 B2 | 9/2013 | Jones et al. |
| 8,646,100 B2 | 2/2014 | Swingler et al. |
| 2006/0031830 A1 | 2/2006 | Chu et al. |
| 2007/0271600 A1 | 11/2007 | Reuter et al. |
| 2010/0287611 A1 | 11/2010 | Blom et al. |
| 2011/0023082 A1 | 1/2011 | Narasinghanallur et al. |
| 2011/0170693 A1 | 7/2011 | Thomson et al. |
| 2012/0011593 A1* | 1/2012 | Oka .................. G06F 21/6218 726/27 |
| 2012/0102549 A1 | 4/2012 | Mazzaferri et al. |
| 2012/0204266 A1 | 8/2012 | Yoo |
| 2013/0081101 A1 | 3/2013 | Baer et al. |
| 2013/0085774 A1 | 4/2013 | Chen et al. |
| 2013/0097373 A1 | 4/2013 | Kwong |
| 2013/0291081 A1 | 10/2013 | Mechaley, Jr. |
| 2013/0304301 A1 | 11/2013 | Rakshit |
| 2014/0092889 A1 | 4/2014 | Chhabra et al. |
| 2014/0212021 A1 | 7/2014 | Amzaleg et al. |
| 2014/0274031 A1 | 9/2014 | Menendez |
| 2014/0297249 A1 | 10/2014 | Morelli, Jr. et al. |
| 2015/0038173 A1 | 2/2015 | Jackson et al. |
| 2015/0161360 A1 | 6/2015 | Paruchuri et al. |
| 2015/0229626 A1 | 8/2015 | Hauhn |
| 2015/0233720 A1* | 8/2015 | Harada .............. G06K 9/00523 701/409 |
| 2015/0264573 A1 | 9/2015 | Giordano et al. |
| 2015/0281252 A1 | 10/2015 | Melcher et al. |
| 2015/0281955 A1 | 10/2015 | Zhang |
| 2015/0312875 A1 | 10/2015 | Bhanage |
| 2015/0347682 A1 | 12/2015 | Chen et al. |
| 2016/0063503 A1 | 3/2016 | Kobres et al. |

OTHER PUBLICATIONS

Kohler et al., "Classification Model for Access Control Constraints", IEEE International Performance, Computing, and Communications Conference, 2007. pp: 410-417. Apr. 11-13, 2007. DOI: 10.1109/PCCC.2007.35892. http://ieeexplore.ieee.org/stamp/stamp.jsp?tp=&arnumber=4197957&isnumber=4197899.

Byers et al., "Where the Camera Was", Mathematics Magazine, vol. 77, No. 4, pp. 251-259, Oct. 2004. http://www.math.smith.edu/~jhenle/Files/camera.pdf.

Bartley et al., "Environmental-Based Location Monitoring," U.S. Appl. No. 14/976,393, filed Dec. 21, 2015.

List of IBM Patents or Patent Applications Treated as Related, Dec. 18, 2015, 2 pages.

U.S. Appl. No. 14/976,393, Accelerated Examination Support Document, Dated Dec. 15, 2015, 14 pages.

* cited by examiner

ENVIRONMENTAL-BASED LOCATION MONITORING

BACKGROUND

Aspects of the present disclosure relate to information security, more particular aspects relate to environmental-based location monitoring in computer systems. While the present disclosure is not necessarily limited to such applications, various aspects of the disclosure may be appreciated through a discussion of various examples using this context.

In applications where sensitive algorithms, data, or other program elements are stored, developed, and housed within non-volatile memory elements, there can be a concern that these sensitive elements could be accessed and thus have their security compromised. In order to improve data security, mechanisms could be used to detect intrusion attempts, prohibit unauthorized power-on of hardware, or to otherwise make it difficult to access data without authorization.

SUMMARY

Aspects of the present disclosure are directed towards a method of environmental based location monitoring. In embodiments, the method can include collecting, in response to a condition for a computer, a first set of image data that corresponds to a first set of environmental characteristics existing within a bounded area encompassing a hardware element of the computer. In embodiments, the method can include determining, by analyzing the first set of image data, a first location corresponding to a geographic position of the hardware element relative to the first set of environmental characteristics, and determining, by analyzing a second set of image data, the second set of image data corresponding to a second set of environmental characteristics, a second location corresponding to an approved geographic position of the hardware element relative to the second set of environmental characteristics. In embodiments, the method can include comparing the first location to the second location, and determining, by comparing the first location to the second location, an environmental difference using a location difference between the first location and the second location. In embodiments, the method can include determining that the environmental difference does not satisfy a threshold, and executing a reaction sequence in the computer, in response to determining that the environmental difference does not satisfy the threshold.

Aspects of the present disclosure are directed towards a system for environmental-based location monitoring. In embodiments, the system can include a processor and a computer readable storage medium having program instructions embodied therewith. In embodiments the program instructions can be executable by the processor to cause the system to collect, in response to a condition for the system, a first set of image data that corresponds to a first set of environmental characteristics existing within a bounded area encompassing a hardware element of the system. In embodiments, the program instructions can cause the system to determine, by analyzing the first set of image data, a first location corresponding to a geographic position of the hardware element relative to the first set of environmental characteristics, and determine, by analyzing a second set of image data, the second set of image data corresponding to a second set of environmental characteristics, a second location corresponding to an approved geographic position of the hardware element relative to the second set of environmental characteristics. In embodiments, the program instructions can cause the system to compare the first location to the second location, and determine, by comparing the first location to the second location, an environmental difference using a location difference between the first location and the second location. In embodiments, the program instructions can cause the system to determine that the environmental difference does not satisfy a threshold, and execute a reaction sequence in the computer, in response to determining that the environmental difference does not satisfy the threshold.

Aspects of the present disclosure are directed towards a computer program product for environmental-based location monitoring, the computer program product comprising a computer readable storage medium having program instructions embodied therewith, the program instructions executable by a computer to cause the computer to perform a method. In embodiments, the method can include collecting, in response to a condition for a computer, a first set of image data that corresponds to a first set of environmental characteristics existing within a bounded area encompassing a hardware element of the computer. In embodiments the method can include determining, by analyzing the first set of image data, a first location corresponding to a geographic position of the hardware element relative to the first set of environmental characteristics, and determining, by analyzing a second set of image data, the second set of image data corresponding to a second set of environmental characteristics, a second location corresponding to an approved geographic position of the hardware element relative to the second set of environmental characteristics. In embodiments, the method can include comparing the first location to the second location, and determining, by comparing the first location to the second location, an environmental difference using a location difference between the first location and the second location. In embodiments, the method can include determining that the environmental difference does not satisfy a threshold, and executing a reaction sequence in the computer, in response to determining that the environmental difference does not satisfy the threshold.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
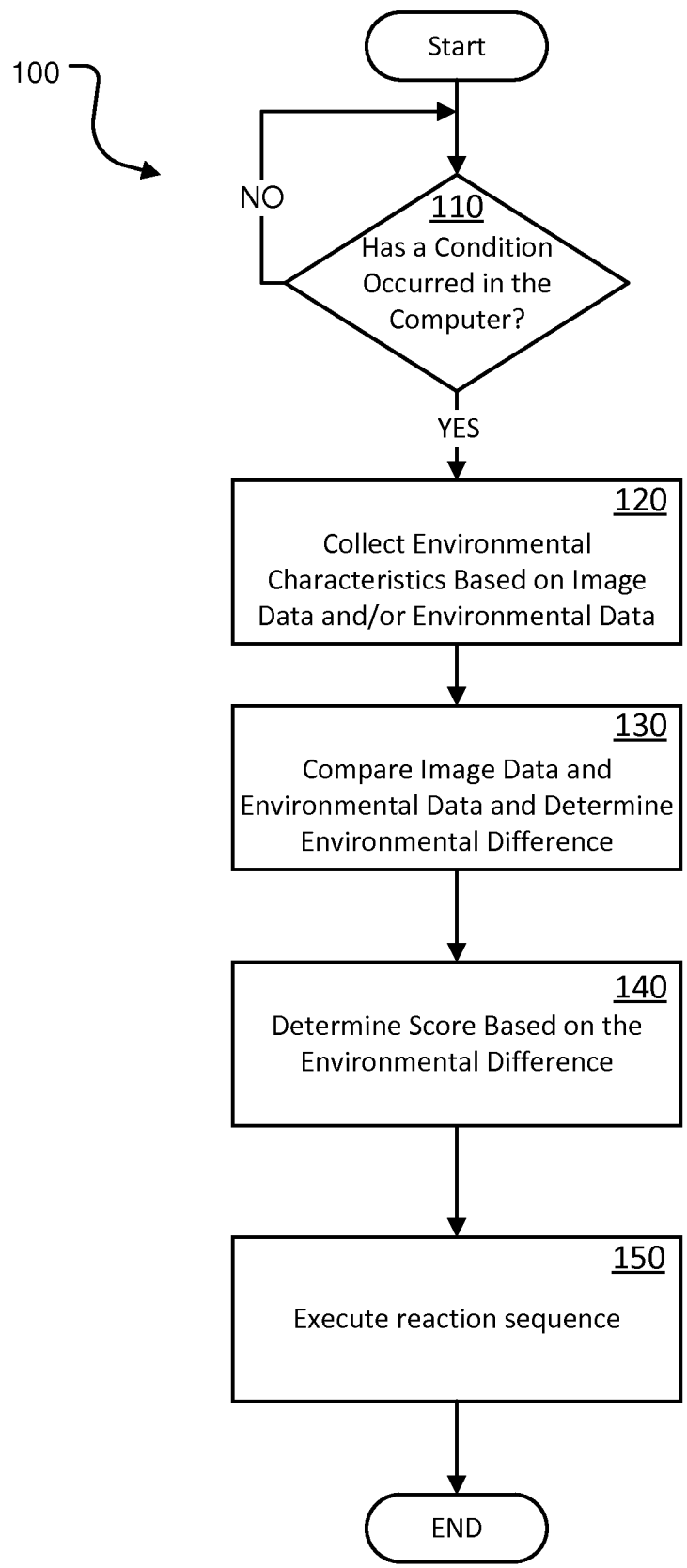
FIG. 1 illustrates a flow chart of a method for environmental based location monitoring, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to information security, more particular aspects relate to environmental-based location monitoring in computer systems. While the present disclosure is not necessarily limited to such applications, various aspects of the disclosure may be appreciated through a discussion of various examples using this context.

In applications where sensitive algorithms, data, or other program elements are stored, developed, and housed within non-volatile memory elements, there can be a concern that these sensitive elements could be accessed and thus have their security compromised. In order to improve data security, mechanisms can be used to detect intrusion attempts, prohibit unauthorized power-on of hardware, or to otherwise make it difficult to access data without authorization can be used.

To assist in data security, sensitive data can be stored in hardware that is housed in a secure location or facility. However, in some instances hardware could be moved out of the secure location, such as while being transported, or receiving maintenance, which could leave sensitive data vulnerable to unauthorized access.

Aspects of the present disclosure are directed towards environmental based computer location monitoring. Embodiments of the present disclosure collect image data and environmental data, compare collected image data and environmental data to what may be expected, and respond in various ways if the image data and environmental data do not match.

A method of environmental based location monitoring can include collecting in response to a condition for a computer, a first set of image data and a first set of environmental data that corresponds to a first set of environmental characteristics existing within a bounded area encompassing one or more hardware elements of the computer, such as a storage system.

In some embodiments, the hardware elements, of the computer may be transported or assembled separately from the computer. For example, the hardware elements may be a hard disk drive, computer storage, or a processor. In embodiments, the hardware elements may be connectively coupled to the computer. For example, the hardware element may be a processor and the processor may be assembled in a blade server. In some embodiments, in order to secure such isolated hardware elements, the sensors may be coupled to the hardware elements. For example, the sensor may be attached to the processor. In embodiments, the bounded area may be external to the hardware elements. For example, the sensor may collect image data and environmental data external to the hardware elements.

In embodiments, the condition may be various circumstances that influence the actions of a computer. For example, the condition could be a command to power-on a portion of the computer, to access data from the computer, to execute an application, or other type of computer-based command. In certain embodiments, the condition can be an expiration of a time-based interval. For example, the expiration of the time-based interval may trigger the condition to occur every x number of minutes, where x can be any positive numerical value, e.g. every ten minutes, every hour, or every five hours.

The image data may be an electronic representation of one or more environmental characteristics. For example, the image data may be represented in pixels as display. For example, in embodiments, the image data could be various types of data extracted from a digital image (e.g. average pixel intensity data, digital numeric color data). In some embodiments, the digital image can be a numerical representation of a two dimensional image.

In embodiments, the environmental data could be an electronic representation of one or more environmental characteristics. For example, in the form of numeric values. For example the environmental data may be various forms of data extracted from a sensor measuring one or more physical stimulus. In embodiments, the physical stimulus may be heat, light, sound, pressure, magnetism, or a particular motion. For example, the light may be visible, ultraviolet, infrared, etc. For example, the environmental data may include numerical values for temperature, pressure, or humidity.

In some embodiments, the environmental characteristics could be defined as a set of distinctive physical conditions or qualities of a particular place. In embodiments, the environmental characteristics for the image data may include one or more constituents of matter (e.g. structural objects, furniture, people, etc.). In embodiments, the distinctive physical conditions of the environmental characteristics may include the temperature, altitude, or humidity of the particular place.

In embodiments, the sensor may be an instrument that measures a physical stimuli and converts them into signals or data. For example, the sensor may be a digital camera, a thermometer, an ultrasonic instrument, or a voltmeter. For example, the digital camera may measure visible light, the thermometer may measure temperature, or the ultrasonic instrument may measure pressure. In embodiments, the digital camera may collect image data, and the thermometer, ultrasonic instrument, and voltmeter may collect environmental data.

For example, the bounded area may be defined by the range of a sensor collecting data. The range may be external to the computer chassis. For example, in embodiments, the range of detecting visible light from objects may be less than the range of detecting infrared light from objects. For example, infrared light radiating from people behind solid objects. For example the range may be set to a maximum range defined by the capabilities of the sensors. In additional examples, the range may be set by a user, e.g. the user may set the range to 10 feet.

In embodiments, the first set of environmental data may be environmental data that corresponds to environmental characteristics existing within the bounded area. For example, the first set of environmental data may be collected in the bounded area after the condition occurs. The environmental data may be an electronic representation of the physical stimuli detected by the sensors. For example, in the form of numerical values. For example, for numerical values for temperature, pressure, and humidity.

In embodiments, the first set of image data may be image data that corresponds to environmental characteristics existing within the bounded area. For example, when the computer is turned on, the digital camera may detect the reflected light in a room and convert electrical signals into data. For example, reflected light from walls, chairs, or pictures. For example, a picture may be a two dimensional barcode. In embodiments, the first set of image data may include information, such as, where objects are located in the detectable range of the sensors relative to another object.

Furthermore, in embodiments, the environmental characteristics may be organized in multiple sets based on the type of environmental characteristics. For example, a first set of environmental characteristics, could include temperature data. A second set of environmental characteristics could include color data. A third set of environmental characteristics could include humidity data. In embodiments, the method can include comparing similar environmental characteristics. For example, temperature data of the first set of environmental data could be compared to temperature data from an approved operating environment. In embodiment, the approved operating environment may be where the computer is intended to operate in, e.g. a secured facility. In other embodiments, the approved operating environment may be an area established or decided in advance to shipping the computer.

In embodiments, the approved operating environment may comprise predetermined environmental characteristics that the system looks for. For example, if the computer is meant to be housed in a climate controlled environment of seventy degrees Fahrenheit, the predetermined environment characteristic may include a temperature of seventy degrees.

In embodiments, a second set of image data and a second set of environmental data includes data that corresponds to information about the predetermined environmental characteristics. In embodiments, the second set of image data may be an electronic representation of the predetermined environmental characteristics from the approved operating environment. In embodiments, the second set of image data can include an approved set of image data for an operating environment for the computer. For example, if the computer is meant to be housed in an environment that includes a two dimensional barcode, the second set of image data may include information about the location of the two dimensional barcode and/or characteristics of the two dimensional barcode.

In embodiments, the second set of image data may be an electronic representation of the predetermined environmental characteristics from the approved operating environment. In embodiments, the second set of environmental data may be an electronic representation of the predetermined environmental characteristics from the approved operating environment. In embodiments, the second set of environmental data can include an approved set of environmental data for an operating environment for the computer. For example, if the computer is meant to be housed in an environment that can include climate controlled environment of seventy degrees, the second set of environmental data may include numerical data representing the temperature set at seventy degrees.

In some embodiments, the approved operating environment can include an approved geographic position. In embodiments the approved geographic position can be represented by a position, such as represented in Cartesian coordinates as described herein, of a hardware element relative to various environmental characteristics in the bounded area.

In certain embodiments, the second set of image data and the second set of environmental data may be stored in non-volatile memory in the computer. The non-volatile memory may be operatively coupled to the computer. The non-volatile memory that is storing the second set of image data and the second set of environmental data may not be accessible after the condition occurs. For example, once the computer is turned on, the second set of image data or the second set of environmental data may not be accessible. The non-volatile memory may not be accessible after time zero, so unauthorized users attempting to extract the second set of image data or the second set of environmental data may fail in retrieving information from the computer or hardware elements.

In some embodiments, analyzing the image data may occur after collecting the image data. In embodiments, analyzing may include examining the constitution or structure of the image data in the form of utilizing techniques commonly employed in 'machine vision'. In some embodiments, machine vision is the technology and methods of providing imaging-based automatic inspection and analysis for such applications as automatic inspection, process control, and robot guidance in industry, such as, e.g. 'computational projective geometry' and 'camera calibration' discussed herein and as discussed in as described in "BYERS et al., "Where the Camera Was", Mathematics Magazine, Vol. 77, No. 4, pp: 251-259, October 2004. http://www.math.smith.edu/~jhenle/Files/camera.pdf."

In embodiments, the techniques may include calculating a first volume of the bounded area. In embodiments, the first volume may be external to the computer up to the range of the sensor collecting visible light. For example, the range may stop at a wall that bounds the computer. For example, the first volume may be of a room that bounds the computer.

In embodiments, the techniques may also include determining the geographic location of the computer relative to the environmental characteristics in the bounded area. For example, taking a digital image of the environmental characteristics contained in the range of the sensors, then inferring the geographic location by extracting information from the image data.

In certain embodiments, the techniques may include determining the relative position of a first object in the approved operating environment. For example, the relative position of the first object may be taken with respect to a second object. For example, the first object may be a picture and the second object may be a chair. For example, the distance between the picture and the chair may be calculated from the relative position.

The method can include comparing the first set of image data to the second set of image data. The method can include determining an environmental difference between the first set of image data and the second set of image data. In embodiments, an environmental difference may be a representation of the quantitative contrast between the environmental characteristics contained in the bounded area and the predetermined environmental characteristics for the approved operating environment. In embodiments, the environmental difference may be represented using various units. For example the environmental difference may have units of Fahrenheit for temperature or meters for volume. The method can include determining that the environmental difference does not satisfy a threshold.

In embodiments, the threshold may be a numerical representation indicating the limit of an acceptable difference between the environmental characteristics and the approved environmental characteristics. In embodiments, achieving the threshold may be accomplished when the magnitude of the environmental difference is less than the magnitude of the threshold. In embodiments, the threshold for the geographic location can have units that are relevant to the environmental difference units that are based off the geographic location, e.g. units of meters.

For instance, in embodiments, consider a threshold for the geographic location of the computer to be one foot. Continuing the instance, in embodiments, if the geographic location of the computer in the bounded area differs by a magnitude of more than one foot from the geographic location of the computer in the approved operating environment, the threshold may not be satisfied. In certain embodiments, not achieving the threshold may cause a reaction to occur.

In certain embodiments, environmental characteristics that can be susceptible to errors in the environment may be given a larger threshold, accordingly. For instance, body heat or friction near the computer may disturb with collecting image data or environmental data. In embodiments, each environmental difference may have their own respective threshold, according to the susceptibility of the environmental characteristic to nearby physical conditions. For instance, because the temperature and humidity may be more likely to be affected by body heat or friction than the volume, a system could tolerate a higher environmental difference with regard to temperature and humidity than with regard to volume. For example, the threshold for temperature or humidity may be higher than the threshold for volume.

The method can include determining a score that is based on the environmental difference. In embodiments, the score can be a representation of the difference between the bounded area and the approved operating environment. In some embodiments, scoring may include placing a numerical value on the difference between the environmental difference and the respective threshold. In embodiments, the score may distinguish an environmental difference that satisfies the threshold from an environmental difference that does not satisfy the threshold.

In certain embodiments, scoring may include weighing the environmental difference. In embodiments, weighing may be a numerical representation of the relative difficulty of reproducing an environmental characteristic in the form of a positive numerical value. For example, image data may be weighted three times as much as temperature data, since reproducing a two dimensional barcode may be difficult, but reproducing a temperature of seventy degrees may happen by coincidence.

For example, a room that the computer is operating in could have the following characteristics: a temperature of seventy degrees, a set of coordinates representing the geographic location of the computer within the room, and a two dimensional barcode in range of the sensor. Continuing the example, there may be a plethora of locations that are seventy degrees, but environmental characteristics comprising a matching set of coordinates or a matching two dimensional barcode may be much more difficult to duplicate. For this reason, the weight may be adjusted according to the environmental characteristic.

The method can include executing a reaction sequence in the computer if the environmental difference does not satisfy the threshold. In some embodiments, the reaction sequence can be a set of events occurring in the computer in response to one or more thresholds not being satisfied. For example, if the temperature in the approved operating environment is 50 degrees Fahrenheit and the temperature in the bounded area is seventy degrees Fahrenheit, and the threshold is set at 10 degrees Fahrenheit.

In embodiments, the reaction sequence initiate one or more alarms in response to one or more thresholds not being satisfied. In embodiments, the one or more thresholds may overwrite data stored in the computer, physically damage the computer, shut-down the computer, or initiate one or more alarms. Initiating the reaction sequence may be with the intention to restrict the user from accessing the computer or 'sensitive' information stored in the computer.

Turning now to FIG. 1, a flow chart for a method 100 of environmental based location monitoring can be seen, according to various embodiments. In embodiments, the method can include, in decision block 110, determining whether a condition occurs. In embodiments, the computer could be a programmable machine that is capable of executing a set of operations. In some embodiments, the condition can be a command for the computer to perform a set of operations. If a condition occurs, in decision block 110, the method may proceed to operation 120. If a condition does not occur, the method 100 may repeat until a condition Occurs.

In certain embodiments, the method can include, in operation 120, collecting the first set of image data in the bounded area. In embodiments, the operation 120 can include analyzing the first set of image data after collecting the first set of image data, as discussed herein. For example, determining the first volume, average image intensity, or the geographic location of the computer.

In embodiments, the operation 130 can also include collecting the first set of environmental data in the bounded area. For example, temperature, humidity, and pressure. In embodiments, after collecting and analyzing the image data and the environmental data, the operation 120 can proceed to an operation 130.

In embodiments, the method can include, in operation 130, comparing the first set of image data to the second set of image data. For example, comparing the first volume to the second volume. For example, comparing the first geographic location to the second geographic location. In embodiments, after comparing the image data, operation 130 may include determining an environmental difference for the image data as discussed herein. For example, the environmental difference with respect to the volume may be the first volume subtracted from the second volume, where the volume may be represented in units of cubic meters.

In embodiments, the operation 130 also can include comparing the first set of environmental data to the second set of environmental data. For example the temperature from the bounded area and the temperature in the approved operating environment. For example, the humidity in the bounded area and the temperature in the approved operating environment. In embodiments, after comparing the environmental data, operation 130 may include determining an environmental difference. For example, determining the environmental difference for the temperature, humidity, or the pressure.

In embodiments, the operation 130 can include determining if the environmental differences satisfy the threshold. In embodiments, the thresholds vary, depending on the environmental characteristic, as discussed herein. For example, the environmental difference for temperature may have a higher threshold than the environmental difference for volume. In embodiments, after comparing, determining the environmental difference, and if the threshold are satisfied, the operation 130 may proceed to an operation 140.

In embodiments, the method can include, in operation 140 scoring the environmental differences. For example, the environmental difference for the first volume and second volume may be scored. For example, scoring may occur for environmental differences that do not satisfy the threshold. In embodiments, once scoring of the environmental differences is complete, the operation 140 may proceed to an operation 150.

In embodiments, the method can include, in operation 150, executing the reaction sequence. In embodiments, executing the reaction sequence, as discussed herein, may be in response to the one or more thresholds not being satisfied. For example, executing the reaction sequence may be in response to the environmental difference for temperature not achieving the threshold. For example, executing the reaction sequence may be in response to the environmental difference for temperature and the environmental difference for volume not achieving their respective thresholds.

Figure 2:
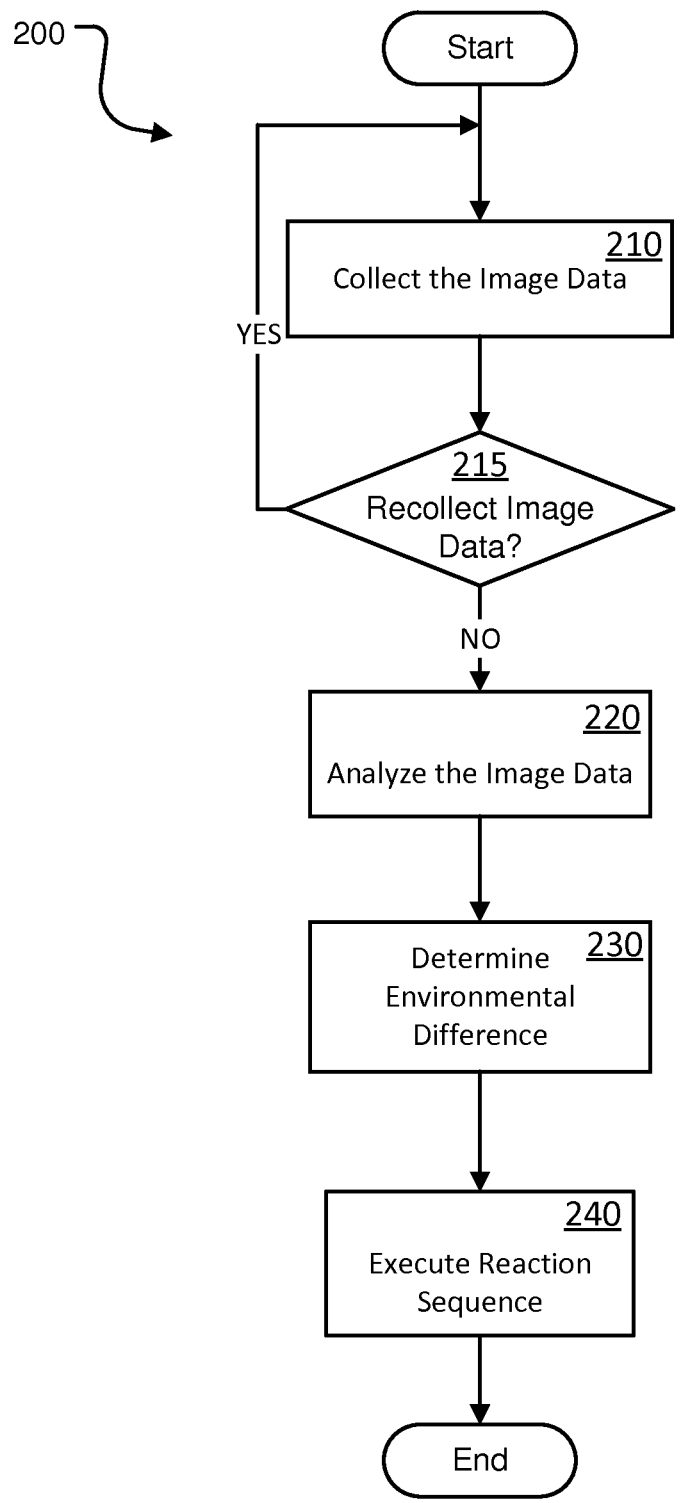
FIG. 2 illustrates a flow chart for a method of collecting and analyzing image data, according to various embodiments.

Turning now to FIG. 2, a flow chart for a method 200 of processing image data can be seen, according to various embodiments. In certain embodiments, the method can include, in operation 210, collecting a first set of image data from a bounded area. For example, the first set of image data may include visible light, ultraviolet light, or infrared light. For example, the digital camera may collect the first set of image data. In embodiments, the operation 200 can include aborting the method 200, in the case that the camera is not functioning correctly. In embodiments, operation 210 may also include collecting the first set of environmental data in the bounded area.

In embodiments, the method 200 can include, in operation 210, extracting the environmental characteristics from the first set of image data and the first set of environmental characteristics. For example, organizing the collected data into numerical values describing the environmental characteristics. For example, this may include the temperature, first volume, or geographic location.

In embodiments, operation 210 also can include implementing additional techniques to further analyze the digital image, in the case if the image data is unreadable. For example, in the case where either the stored data is unreadable, or the ability to successfully collect or interpret the image data is unsuccessful. For example, if the computer is not capable of processing or interpreting the image data. For example, the image data may be unreadable if the computer is not capable of producing results from the collected data.

In embodiments, additional techniques can include extracting a first average image intensity of the digital image corresponding to the first set of environmental characteristics rather than extracting a specific pixel content. In embodiments, the additional techniques include comparing the first average image intensity to a second average image intensity corresponding to the second set of environmental characteristics.

In embodiments, the additional technique may include extracting a first smaller portion corresponding to the first set of image data. In embodiments, comparing the first smaller portion to a second portion corresponding to the second set of image data may determine the picture quality. In embodiments, operation 210 may proceed to an operation 215 after collecting and analyzing the data.

In certain embodiments, the method 200 can include, in decision block 215, recollecting the image data, if the results of the additional techniques are inconclusive. In embodiments, inconclusive meaning that the techniques may not have led to a firm conclusion. In embodiments, if the image data is readable, the method 200 may proceed to an operation 220; otherwise, the method 200 could return to operation 210.

In certain embodiments, the method 200 can include, in operation 220, analyzing the first set of image data. In embodiments, analyzing the first set of image data includes using various techniques commonly used in 'machine vision', such as, e.g. 'computational projective geometry' and 'camera calibration' as described herein.

In embodiments 'computational projective geometry' can include detecting the positions of one or more objects to environmental characteristics existing within the bounded area. For example, the relative positions may be where one or more first objects are located on a wall with respect to one or more second objects, e.g. the distance between two pictures hanging on a wall.

In some embodiments, 'computational projective geometry' can include detecting the shape of one or more objects within the first set of image data. For example, the shape of the one or more objects may be a three dimensional or a two dimensional polygon, e.g. a square or a cube, rectangle, hexagon, octagon, etc. . . . . . In some embodiments, 'computational projective geometry' includes determining the volume of a room that the computer is located in. In embodiments, the volume may be represented in cubic meters.

In certain embodiments, 'camera calibration' can include determining the geographic location of the computer relative to the environmental characteristics. In certain embodiments, by way of 'camera calibration', the information obtained from the 'computational projective geometry' can be used to deduce the geographic location of the computer within the bounded area. The geographic location may be described in Cartesian coordinates, e.g. (x, y, z) to an arbitrary reference point in the room as the origin as discussed herein. In embodiments, after analyzing the first set of image data, the operation 220 can proceed to an operation 230.

In embodiments, the method 200 can include, in operation 230, comparing a first location to a second location. In some embodiments, the first location may be a representation of the geographic location of the computer relative to the first set of environmental characteristics. In certain embodiments, the second location may be a representation of the geographic location of the computer relative to the second set of environmental characteristics. The second location may correspond to predetermined environmental characteristics in the approved operating environment. For example, the location of the computer in the approved operating environment. In embodiments, the geographic location may be represented as a set of coordinates.

In other embodiments, operation 230 can include comparing a first volume to a second volume. In some embodiments, the first volume may be a numerical representation of the volume of the room via the first set of environmental characteristics. In certain embodiments, the second volume may be a numerical representation of the volume of the room via the second set of environmental characteristics. In embodiments, the second volume may correspond to predetermined environmental characteristics in the approved operating environment. For example, the volume of the approved operating environment.

In embodiments, operation 230 can include comparing the first set of environmental data to the second set of environmental data from the approved operating environment. For example, temperature, humidity, and pressure from the bounded area may be compared from temperature, humidity, and pressure from the approved operating environment. In embodiments, after comparing the first set of image data to the second set of image data, and the first set of environmental data to the second set of environmental data, operation 230 may also include determining the difference from the first set of environmental characteristics and the third set of environmental characteristics.

In some embodiments, the method 200 can include, in operation 230, determining the environmental difference. In embodiments, the environmental difference may be a numerical representation of the difference between the first location and the second location in the form of a magnitude. In other embodiments, the operation 230 includes determining the environmental difference between the first volume and the second volume.

In embodiments, operation 230 can include determining the difference from the first set of environmental data and the second set of environmental data. For example, determining the difference between the temperature in the bounded area and the temperature in the approved operating environment. For example, determining the difference from the environmental characteristics and the predetermined environmental characteristics. The difference may be termed the environmental difference.

In embodiments, the operation 230 can include determining a score (S), wherein the score is a numerical representation of the difference between the environmental differences and the respective thresholds. For example, in some embodiments, the score may be the aggregate of all environmental differences. For example, the score may be represented using various units. For example, the score may be weighted according to the environmental characteristic. For example, the value of the score may be a comprehensive evaluation of the difference between the bounded area and the approved operating environment.

In certain embodiments, the method 200 can include, in operation 240 determining the score of the acceptable environmental differences between the first set of environmental characteristics and the third set of environmental characteristics within their respective thresholds. For example, the environmental difference based off of the first location and the second location may satisfy the threshold, if the magnitude of the environmental difference is less than or equal to the magnitude of the location difference. For example, the environmental difference based off of the first volume and the second volume may satisfy the threshold, if the magnitude of the environmental difference is less than or equal to the magnitude of the volume difference. In embodiments, after determining the environmental differences and scores, the operation 230 may proceed to an operation 240.

In embodiments, the method 200 can include, in operation 240, executing the reaction sequence. In embodiments, the reaction sequence could be a sequence of events occurring in response to one or more thresholds not being satisfied. In embodiments, the reaction sequence may be illustrated in greater detail in FIG. 3.

Figure 3:
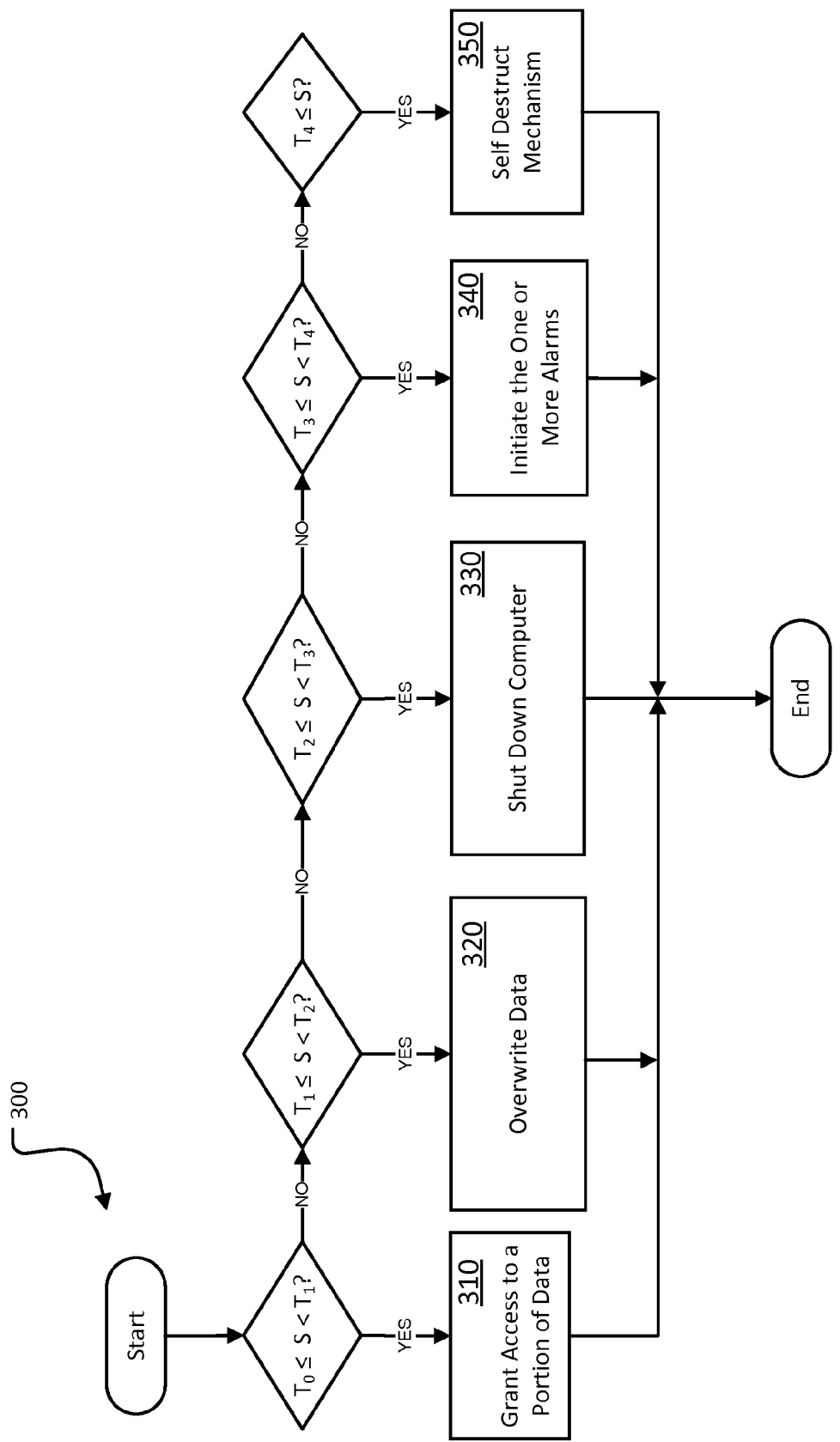
FIG. 3 illustrates a flow chart for a method for executing a reaction sequence, according to various embodiments.

Turning now to FIG. 3, a flow chart of a method 300 for the reaction sequence can be seen, according to various embodiments. The reaction sequence illustrated in FIG. 3 may be an embodiment of operation 150 or operation 240. In embodiments, the method 300 may include, checking at each decision block if the score is within a threshold range of the current decision block. For example, in embodiments, each decision block may have its own threshold range. In embodiments, predetermined numerical values in increasing order labeled $T_0$, $T_1$, $T_2$, $T_3$, and $T_4$, e.g. $T_0<T_1<T_2<T_3<T_4$ may constitute boundaries that the score can fall within. For example, in embodiments, the score may begin at the decision block with a threshold range of $T_0 \leq S<T_1$. If the environmental score is not within the threshold range $T_0 \leq S<T_1$, the score may proceed to the decision block with the threshold range including $T_1 \leq S<T_2$, and continue until the score reaches a decision block with a threshold range that the score is within.

In embodiments, executing a response in the reaction sequence depends on the value of the score. For example, a score with a value in between $T_0 \leq S<T_1$ may lead to a different response than a score with a value in between $T_1 \leq S<T_2$. For example, a value in between $T_1 \leq S<T_2$ may grant the user partial access to the computer, and a value in between $T_1 \leq S<T_2$ may overwrite data stored in the computer. In embodiments, employing the reaction sequence may occur in order to restrict unauthorized end users from attempting to access information stored in the computer.

In certain embodiments, the operation 310 can include granting the end user partial access to the computer. In embodiments, operation 310 occurs if the score has a value of $T_0 \leq S<T_1$. In embodiments, granting the end user access may not necessarily mean granting access to all information stored in the computer. Although access may be granted to the computer, the condition may reoccur in response to the expiration of a time-based interval. In embodiments, the time-based interval may cause the method 100 to reoccur. In certain embodiments, the score may proceed to an operation 320, if the score has a value of $T_1 \leq S$.

In some embodiments, the method 300 can include, in operation 320 overwriting a set of data stored in the computer. In embodiments, overwriting the set of data may be the process of writing a binary set of data stored in the memory, the memory that is operatively connected to the computer. In embodiments, overwriting may include writing over old data stored in the memory. For example, in embodiments, the set of data may be deleted by overwriting the set of data in binary with all zeroes followed by all ones so that the set of data is unreadable.

In embodiments, overwriting the set of data may include rewriting the set of data. For example, in certain embodiments, overwriting the information could include formatting the set of data with random information or an explanation as to why executing the reaction sequence may have been necessary. In embodiments, the score may proceed to an operation 330, if the score has a value of $T_2 \leq S$.

In embodiments, the method 300 can include, in operation 330, shutting down the computer. In some embodiments, shutting-down the computer may be done by restricting power to the computer. In some embodiments, shutting-down the computer may transpire for a varying amount of time. For example, in embodiments, shutting-down the computer may be temporary, permanently, or until determining a solution as to why executing the reaction sequence may have been necessary. In some embodiments, the score may proceed to an operation 340, if the score has a value of $T_3 \leq S$.

In certain embodiments, the method 300 may include, in operation 340, initiating one or more alarms. In embodiments, the one or more alarms may include an electromagnetic alarm, an auditory alarm, or a smoke alarm. For example, in embodiments, the electromagnetic alarm may send out electromagnetic waves in the infrared spectrum or the ultraviolet spectrum and the auditory alarm can be a high-pitched frequency. In certain embodiments, the score can proceed to an operation 350, if the score has a value of $T_4 \leq S$.

In embodiments, the method 300 can include, in operation 350, initiating a self-destruct mechanism. In some embodiments, initiating the self-destruct mechanism may be in the form of causing physical damage to hardware that restricts access to a portion of data. For example, causing damage may affect the electrical circuitry of the computer beyond repair.

Figure 4A:
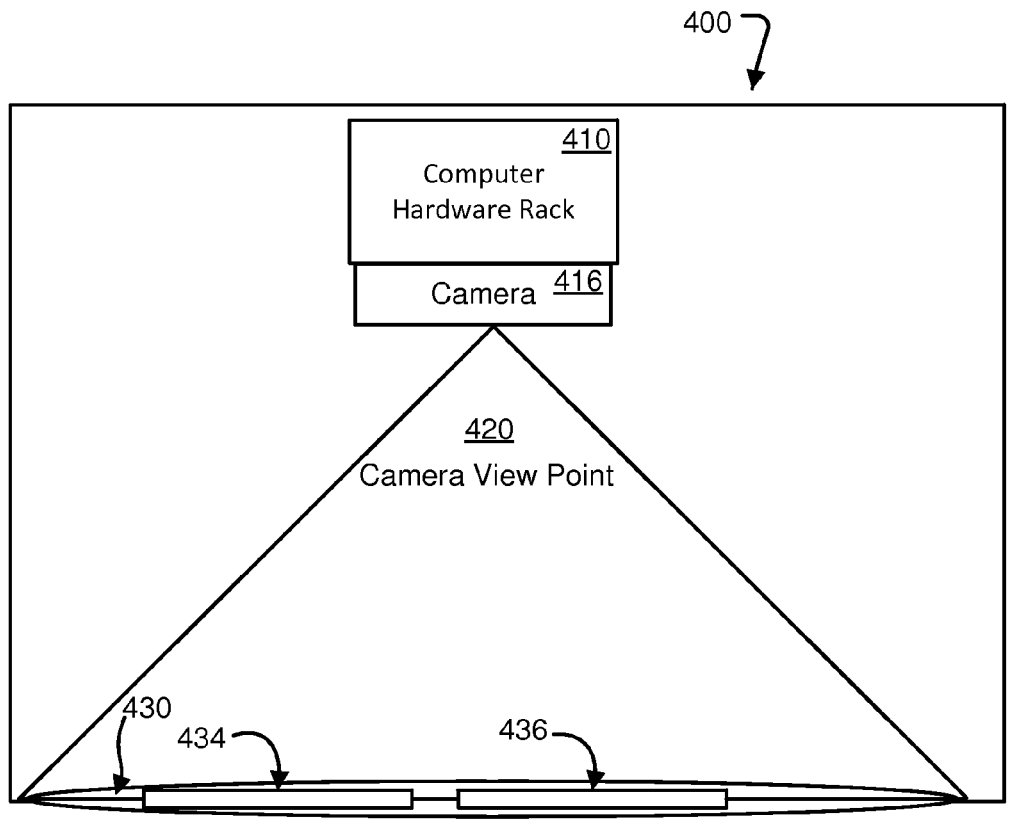
FIG. 4A and FIG. 4B illustrate diagrams of image data collection, according to various embodiments.

Turning now to FIG. 4A, an aerial view 400 of a computer bounded by four walls and a floor can be seen, according to various embodiments. In embodiments, FIG. 4A may be an illustrative representation of the bounded area or approved operating environment where collecting the image data may occur. In embodiments, the aerial view 400, includes four walls and the floor bounding a computer hardware rack 410, a camera 416, and a first object 434 and a second object 436 located on a wall 430.

In embodiments, the aerial view 400, can include the camera 416 collecting the first set of image data within the camera view point 420. In embodiments, the camera view point 420 is facing away from the computer hardware rack and facing outward toward a wall 430. The wall 430 as seen by the camera view point 420 can also be seen, according to embodiments. In certain embodiments, a camera 416 can be physically connected to the computer, and the computer may be positioned in a computer hardware rack 410. In embodiments, the computer hardware rack is discussed in greater detail in the discussion of FIG. 5.

In embodiments, the camera may be a digital camera that collects and encodes visible light. For example, the digital camera may produce an electronic representation of the bounded area in the form of a digital image. In embodiments, the digital image may contain information, such as, e.g. the results of machine vision. In embodiments, the camera may detect visible light within the camera view point that enters the camera lens. The camera view point may describe a physical area where light may be collected by the camera. For example, light reflecting off a wall may be within the camera view point if the light is directed to the camera lens.

Figure 4B:
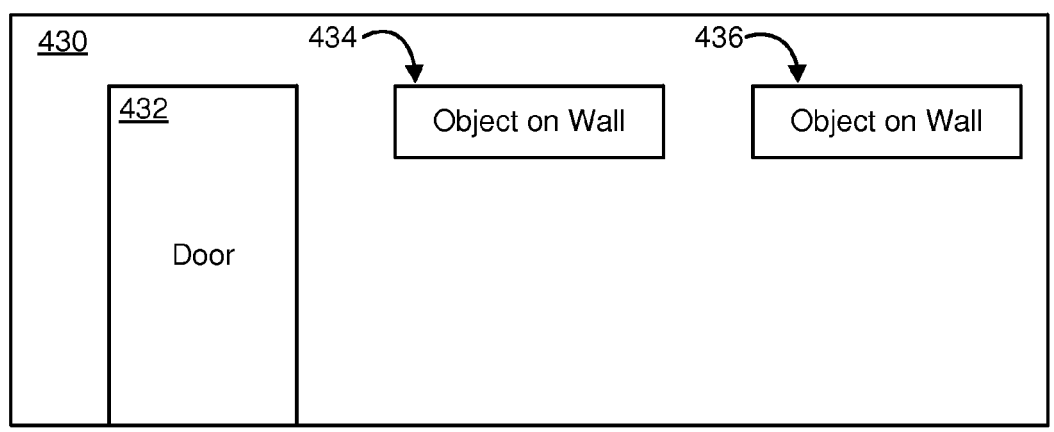

Turning now to FIG. 4B, an example view of the camera view point 420 can be seen, according to various embodiments. The environmental characteristics depicted in the camera view point 420 of the wall 430 may include a doorway with an ajar door 432 and a first object 434 and a second object 436. In embodiments, the first object 434 and the second object 436 may include an image containing a complex design, e.g. an abstract picture, a two dimensional barcode, or a simple white picture. In embodiments, a frame may be bordering the image. In embodiments, the bordering may be, e.g., in the shape of an octagon, a polynomial, or ellipse. In embodiments, the door 432 may be ajar or closed. In embodiments, analyzing the image data discussed in reference to FIG. 2 may infer as to whether the door 432 is opened or closed.

In certain embodiments, the 'machine vision' techniques discussed herein may include, drawing a first line from the top right corner of the first object 434 to the top left corner of the second object 436, and tracing a second line from the top left corner of the first object 434 to the top right corner of the door 432. In embodiments, 'machine vision' techniques also include, determining if the first line and the second line are parallel. In certain embodiments, if the first line and the second line are not parallel, the environmental difference may not satisfy the threshold.

Figure 5:
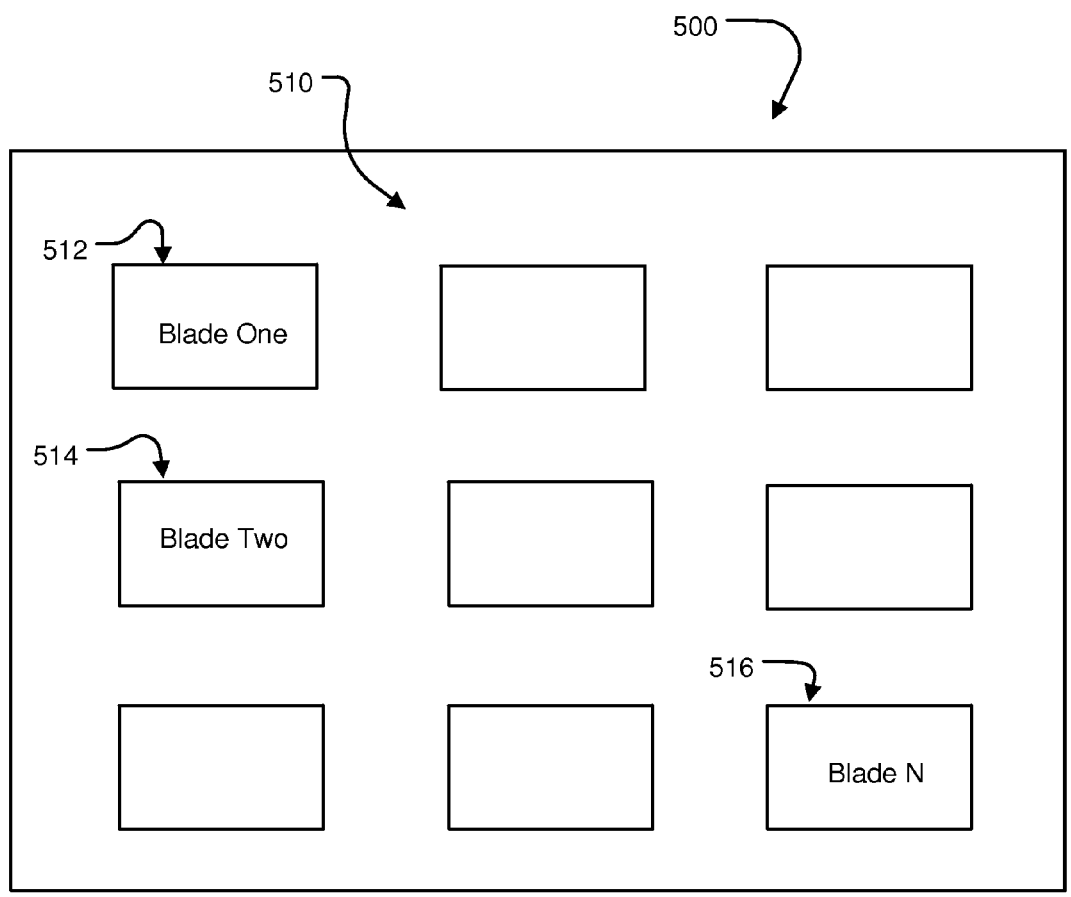
FIG. 5 illustrates a diagram of a computer, according to various embodiments.

Turning now to FIG. 5, an enlarged view 500 depicting a computer hardware rack 510 can be seen, according to embodiments. In certain embodiments, the computer hardware rack 510 may be a blade server housing multiple hardware elements of the computer. In embodiments, the computer hardware rack 510 may include an N amount of blade slots, where N may be any positive numeric value. In embodiments, the blade slots or modules may contain similar content grouping together multiple hardware elements of a computer, e.g. processors, within a rack style system packaging solution. In embodiments, the computer camera 416 may be connected to the computer located in one of the blades in the hardware rack 510. In embodiments, the hardware element of the computer may be located in a computer blade, e.g. blade one 512, blade two 514, or blade N 516. In embodiments, the camera view point 420 may be looking out into the environment where the computer hardware rack may reside. In some embodiments, the location of the computer may be inferred from the image data, e.g., the difference in the location of the computer between a blade one 512 and a blade two 514 can be detected, and the difference may not satisfy the threshold.

Figure 6:
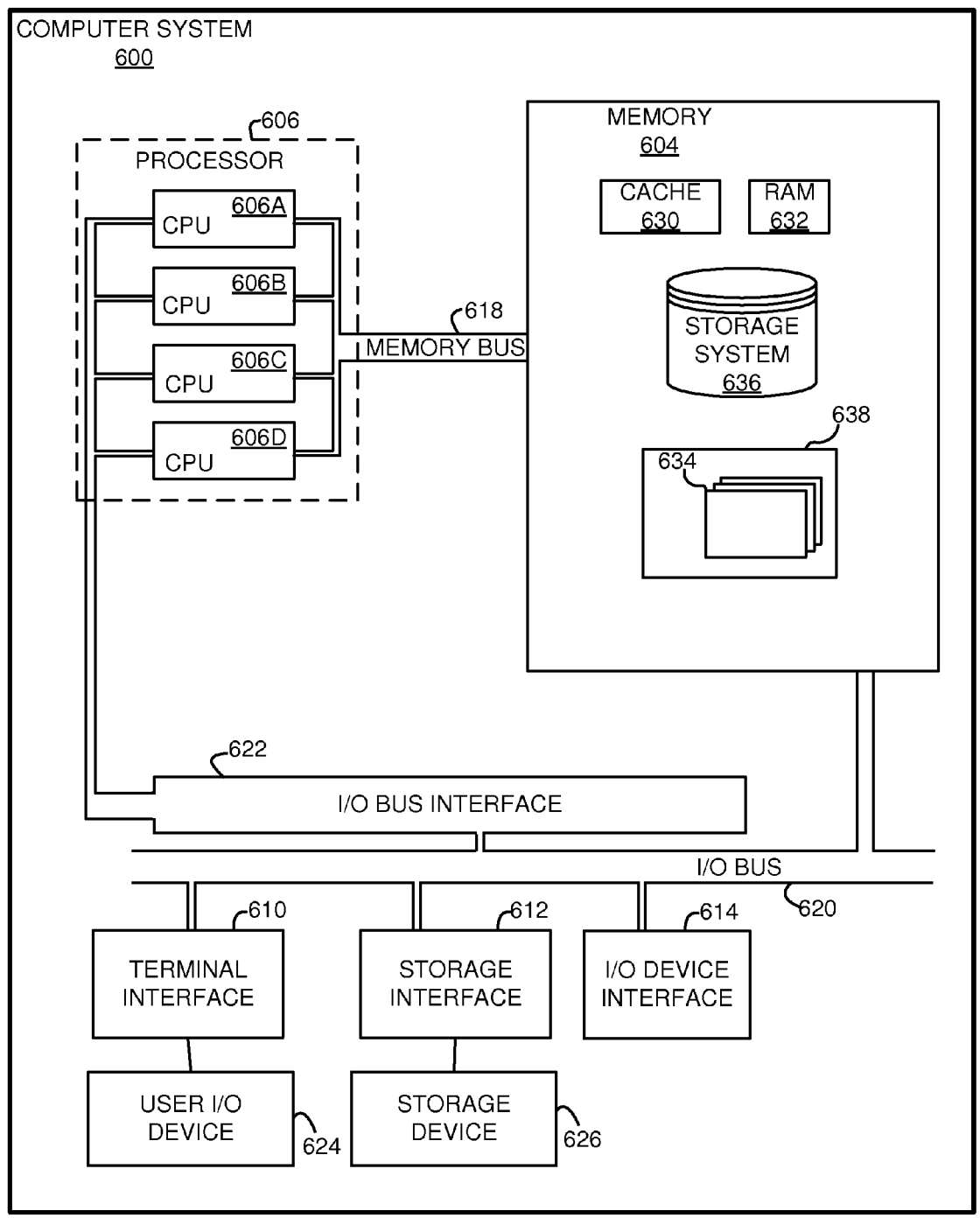
FIG. 6 illustrates a block diagram of a system for environmental based location monitoring, according to various embodiments.

FIG. 6 depicts a high-level block diagram of an exemplary system for implementing an embodiment of the invention. The mechanisms and apparatus of embodiments of the present invention apply equally to any appropriate computing system. The major components of the computer system 600 comprise one or more processors 606, a main memory 604, a terminal interface 610, a storage interface 612, an I/O (Input/Output) device interface 614, a user I/O device 624, and a storage device 626, all of which are communicatively coupled, directly or indirectly, for inter-component communication via a memory bus 618, an I/O bus 620, and an I/O bus interface unit 622.

The computer system 600 may contain one or more general-purpose programmable central processing units (CPUs) 606A, 606B, 606C, and 606D, herein generically referred to as the processor 606. In an embodiment, the computer system 600 contains multiple processors typical of a relatively large system; however, in another embodiment the computer system 600 may alternatively be a single CPU system. Each processor 606 executes instructions stored in the main memory 604 and may comprise one or more levels of on-board cache 630.

In an embodiment, the main memory 604 may comprise a random-access semiconductor memory, storage device, or storage medium (either volatile or non-volatile) for storing or encoding data and programs 634. In another embodiment, the main memory 604 represents the entire virtual memory of the computer system 600, and may also include the virtual memory of other computer systems coupled to the computer system 600 or connected via a network. The main memory 604 is conceptually a single monolithic entity, but in other embodiments the main memory 604 is a more complex arrangement, such as a hierarchy of caches 630 and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 604 may store all or a portion of the following: RAM 632, cache 630, storage system 636, one or more programs/utilities 634, and at least one set of program modules 638. Although the RAM 632, cache 630, storage system 636, one or more programs/utilities 634, and at least one set of program modules 638 are illustrated as being contained within the memory 604 in the computer system 600, in other embodiments some or all of them may be on different computer systems and may be accessed remotely, e.g., via a network. The computer system 600 may use virtual addressing mechanisms that allow the programs of the computer system 600 to behave as if they only have access to a large, single storage entity instead of access to multiple, smaller storage entities. Thus, while the RAM 632, cache 630, storage system 636, one or more programs/ utilities 638, and at least one set of program modules 634 are illustrated as being contained within the main memory 604, these components are not necessarily all completely contained in the same storage device at the same time. Further, although the RAM 632, cache 630, storage system 636, one or more programs/utilities 638, and at least one set of program modules 634 are illustrated as being separate entities, in other embodiments some of them, portions of some of them, or all of them may be packaged together.

In an embodiment, the memory 604 comprise instructions or statements that execute on the processor 606 or instructions or statements that are interpreted by instructions or statements that execute on the processor 606, to carry out the functions as further described with reference to the figures as discussed herein. In another embodiment, the main memory 804 are implemented in hardware via semiconductor devices, chips, logical gates, circuits, circuit cards, and/or other physical hardware devices in lieu of, or in addition to, a processor-based system. In an embodiment, the main memory 604 comprise data in addition to instructions or statements.

The memory bus 618 provides a data communication path for transferring data among the processor 606, the main memory 604, and the I/O bus interface 622. The I/O bus interface 622 is further coupled to the I/O bus 620 for transferring data to and from the various I/O units. The I/O bus interface unit 622 communicates with multiple I/O interface units 610, 612, 614, 624, and 626 which are also known as I/O processors (IOPs) or I/O adapters (IOAs), through the I/O bus 620.

The I/O interface units support communication with a variety of storage and I/O devices. For example, the terminal interface unit 610 supports the attachment of one or more user I/O devices 624, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 624 and the computer system 600, and may receive output data via the user output devices. For example, a user interface may be presented via the user I/O device 624, such as displayed on a display device, played via a speaker, or printed via a printer.

The storage interface 612 supports the attachment of one or more disk drives or direct access storage devices 626 (which are typically rotating magnetic disk drive storage devices, although they could alternatively be other storage devices, including arrays of disk drives configured to appear as a single large storage device to a host computer). In another embodiment, the storage device 626 may be implemented via any type of secondary storage device. The contents of the main memory 604, or any portion thereof, may be stored to and retrieved from the storage device 626, as needed. The I/O device interface 614 provides an interface to any of various other input/output devices or devices of other types, such as printers or fax machines. The network interface provides one or more communications paths from the computer system 600 to other digital devices and computer systems; such paths may comprise, e.g., one or more networks.

Although the memory bus 618 is shown in FIG. 6 as a relatively simple, single bus structure providing a direct communication path among the processors 606, the main memory 604, and the I/O bus interface 622, in fact the memory bus 618 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 622 and the I/O bus 620 are shown as single respective units, the computer system 600 may, in fact, contain multiple I/O bus interface units 622 and/or multiple I/O buses 620. While multiple I/O interface units are shown, which separate the I/O bus 620 from various communications paths running to the various I/O devices, in other embodiments some or all of the I/O devices are connected directly to one or more system I/O buses.

In various embodiments, the computer system 600 is a multi-user mainframe computer system, a single-user system, or a server computer or similar device that has little or no direct user interface, but receives requests from other computer systems (clients). In other embodiments, the computer system 600 is implemented as a desktop computer, portable computer, laptop or notebook computer, tablet computer, pocket computer, telephone, smart phone, or any other appropriate type of electronic device.

FIG. 6 is intended to depict the representative major components of the computer system 600. But, individual components may have greater complexity than represented in FIG. 6, components other than or in addition to those shown in FIG. 6 may be present, and the number, type, and configuration of such components may vary. Several particular examples of such additional complexity or additional variations are disclosed herein; these are by way of example only and are not necessarily the only such variations. The various program components illustrated in FIG. 6 and implementing various embodiments of the invention may be implemented in a number of manners, including using various computer applications, routines, components, programs, objects, modules, data structures, etc., and are referred to herein as "software," "computer programs," or simply "programs."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:
1. A computer-implemented method of environmental based location monitoring, the method comprising:
 collecting, by a sensor electronically connected to a computer and in response to a condition for the computer, a first set of image data that corresponds to a first set of environmental characteristics existing within a bounded area encompassing a hardware element of the computer, the condition includes receiving a computer-based command indicating a set of operations for the computer;
 determining, by a processor analyzing the first set of image data, by utilizing image recognition techniques, a first location corresponding to a geographic position of the hardware element relative to the first set of environmental characteristics, and determining, by the processor analyzing a second set of image data stored in a database of the computer, by utilizing image recognition techniques, the second set of image data corresponding to a second set of environmental characteristics, a second location corresponding to an approved geographic position of the hardware element relative to the second set of environmental characteristics;
 comparing, by the processor, the first location to the second location, and determining, by the processor comparing the first location to the second location, an environmental difference using a location difference between the first location and the second location;

determining, by the processor, that the environmental difference does not satisfy a threshold; and executing, by the processor, a reaction sequence in the computer, in response to determining that the environmental difference does not satisfy the threshold, wherein the reaction sequence includes overwriting a set of data stored in the computer.

2. The method of claim 1, wherein the bounded area is external to the hardware element of the computer and within a range of a sensor collecting the first set of image data and the first set of environmental data.

3. The method of claim 1, further comprising:

comparing the first set of image data to the second set of image data, and determining, by comparing the first and second set of image data, the environmental difference further based on differences between the first set of environmental characteristics and the second set of environmental characteristics.

4. The method of claim 1, further comprising:

collecting, in response to the condition, a first set of environmental data that corresponds to a third set of environmental characteristics existing within the bounded area; and comparing the first set of environmental data to a second set of environmental data, the second set of environmental data corresponding to a fourth set of environmental characteristics, and further determining the environmental difference by comparing the first set of environmental data and second set of environmental data.

5. The method of claim 4, wherein the third set of environmental characteristics includes temperature data, altitude data, and humidity data.

6. The method of claim 1, further comprising:

determining, by analyzing the first set of image data, a first volume corresponding to a volumetric dimension of the bounded area of the first set of environmental characteristics;

determining, by analyzing the second set of image data, a second volume of the bounded area of the second set of environmental characteristics; and wherein comparing the first set of image data to the second set of image data includes:

comparing the first volume to the second volume, and determining, by comparing the first volume to the second volume, the environmental difference using a volume difference between the first volume and the second volume.

7. The method of claim 1, wherein the second set of environmental characteristics correspond to predetermined environmental characteristics within an approved operating environment.

8. A system for environmental-based location monitoring, the system comprising:

a processor; and a computer readable storage medium having program instructions embodied therewith, the program instructions executable by the processor to cause the system to:

collect, by a sensor electronically connected to a computer and in response to a condition for the system, a first set of image data that corresponds to a first set of environmental characteristics existing within a bounded area encompassing a hardware element of the system the condition includes receiving a computer-based command indicating a set of operations for the system;

determine, by a processor analyzing the first set of image data, by utilizing image recognition techniques, a first location corresponding to a geographic position of the hardware element relative to the first set of environmental characteristics, and determine, by the processor analyzing a second set of image data stored in a database of the computer, by utilizing image recognition techniques, the second set of image data corresponding to a second set of environmental characteristics, a second location corresponding to an approved geographic position of the hardware element relative to the second set of environmental characteristics;

compare, by the processor, the first location to the second location, and determine, by the processor comparing the first location to the second location, an environmental difference using a location difference between the first location and the second location;

determine, by the processor, that the environmental difference does not satisfy a threshold; and execute a reaction sequence in the computer, in response to determining that the environmental difference does not satisfy the threshold, wherein the reaction sequence includes overwriting a set of data stored in the computer.

9. The system of claim 8, wherein the program instructions executable by the processor further cause the system to:

compare the first set of image data to the second set of image data, and determine, by comparing the first and second set of image data, the environmental difference further based on differences between the first set of environmental characteristics and the second set of environmental characteristics.

10. The system of claim 8, wherein the program instructions executable by the processor further cause the system to:

collect, in response to the condition, a first set of environmental data that corresponds to a third set of environmental characteristics existing within the bounded area; and compare the first set of environmental data to a second set of environmental data, the second set of environmental data corresponding to a fourth set of environmental characteristics, and further determine the environmental difference by comparing the first set of environmental data and second set of environmental data.

11. The system of claim 10, wherein the third set of environmental characteristics includes temperature data, altitude data, and humidity data.

12. The system of claim 8, wherein the program instructions executable by the processor further cause the system to:

determine, by analyzing the first set of image data, a first volume corresponding to a volumetric dimension of the bounded area of the first set of environmental characteristics;

determine, by analyzing the second set of image data, a second volume of the bounded area of the second set of environmental characteristics; and wherein the program instructions being executable to cause the system to compare the first set of image data to the second set of image data includes being executable to cause the system to:

compare the first volume to the second volume, and determine, by comparing the first volume to the second volume, the environmental difference using a volume difference between the first volume and the second volume.

13. The system of claim 8, wherein the second set of environmental characteristics correspond to predetermined environmental characteristics within an approved operating environment.

14. A computer program product for environmental-based location monitoring, the computer program product comprising a computer readable storage medium having program instructions embodied therewith, wherein the computer readable storage medium is not a transitory signal per se, the program instructions executable by a computer to cause the computer to perform a computer-implemented method comprising:
    collecting, by a sensor electronically connected to a computer and in response to a condition for the computer, a first set of image data that corresponds to a first set of environmental characteristics existing within a bounded area encompassing a hardware element of the computer, the condition includes receiving a computer-based command indicating a set of operations for the computer;
    determining, by a processor analyzing the first set of image data, by utilizing image recognition techniques, a first location corresponding to a geographic position of the hardware element relative to the first set of environmental characteristics, and determining, by the processor analyzing a second set of image data stored in a database of the computer, by utilizing image recognition techniques, the second set of image data corresponding to a second set of environmental characteristics, a second location corresponding to an approved geographic position of the hardware element relative to the second set of environmental characteristics;
    comparing, by the processor, the first location to the second location, and determining, by the processor comparing the first location to the second location, an environmental difference using a location difference between the first location and the second location;
    determining, by the processor, that the environmental difference does not satisfy a threshold; and
    executing, by the processor, a reaction sequence in the computer, in response to determining that the environmental difference does not satisfy the threshold, wherein the reaction sequence includes overwriting a set of data stored in the computer.

15. The computer program product of claim 14, wherein the program instructions, executable by the computer, cause the computer to perform the method further comprising:
    comparing the first set of image data to the second set of image data, and determining, by comparing the first and second set of image data, the environmental difference further based on differences between the first set of environmental characteristics and the second set of environmental characteristics.

* * * * *